United States Patent Office 3,271,333
Patented Sept. 6, 1966

3,271,333
SELF-EXTINGUISHING ALKENYL
AROMATIC POLYMERS
Jacob Eichhorn, Midland, Mich., assignor to The Dow
Chemical Company, Midland, Mich., a corporation of
Michigan
No Drawing. Filed Mar. 28, 1963, Ser. No. 268,598
5 Claims. (Cl. 260—2.5)

This invention concerns a class II self-extinguishing alkenyl aromatic polymer composition and the method for the preparation thereof. More precisely it concerns the enhancement of self-extinguishing properties by the addition of $\alpha,\alpha'$-diphenyl-$\alpha$-methoxybibenzyl to a styrene-containing polymer having a halide incorporated as a flameproofing agent.

A class II self-extinguishing polymer as described herein is one which will not burn with a flame for more than 25 seconds after the removal of a flame used to heat and ignite a standard test bar of the composition. This property is determined according to Underwriter's Subject No. 94 Test.

Various halogenated organic compounds and particularly those containing bromine have been added to polymers to reduce their flammability. These flameproofing agents are effective for the reason that they are unstable at elevated temperatures so that, in the case of bromine compounds, hydrogen bromide is released at high temperature to extinguish the flame. A disadvantage with many of these agents is that decomposition starts when the plastic is being fabricated at an elevated temperature as well as by photochemical stimulus. As a result of this premature decomposition, the resin may become discolored when it is molded or extruded at elevated temperature or the plastic article may darken when exposed to high intensity light. A further problem is that the molding equipment is corroded by the hydrogen bromide. The higher the concentration of the halide in the polymer, the greater will be the discoloration under a particular environment. Additionally, high concentrations of the flameproofing agents plasticize the resin and affect other physical properties of the product.

It is an object of this invention to provide a self-extinguishing alkenyl aromatic polymer having improved stability both at elevated processing temperatures and in the presence of high intensity light. Another object is to reduce the concentration of halogenated additives which is necessary to produce a class II resin.

According to my invention the quantity of halide required to provide class II self-extinguishing properties of an alkenyl aromatic resin can be reduced substantially by the use of about 0.1 to 2.0 weight percent of $\alpha,\alpha'$-diphenyl-$\alpha$-methoxybibenzyl in combination with the halide.

Organic compounds containing chlorine and bromine, with the latter being preferred, are used to provide flameproofing properties. Among the compounds which have been used are acetylene tetrabromide, pentabromomonochloro-cyclohexane, tris(2,3-dibromopropyl) phosphate, 2,2 - bis[3,5-dibromo-4-(2,3,3-tribromoalloxy) phenyl]-propane, tetrachloro dibromo-ethane, bis(2,3,3-tribromo-allyl)maleate, 2,4,6-tribromophenyl acrylate, and 2,3,3-tribromoallyl-2,4,6-tribromophenyl ether. These compounds are known to provide class II self-extinguishing resins when a sufficient amount is added. The amount of halide required for class II properties may be reduced by a factor of two or more with the addition of about 0.1 to 2.0 weight percent of $\alpha,\alpha'$-diphenyl-$\alpha$-methoxybibenzyl as a synergist for the halogen.

These flameproofing agents may be used with alkenyl aromatic homopolymers derived from any of several monomeric materials. Examples of these monomers are styrene, $\alpha$-methyl styrene, ethyl styrene, isopropyl styrene, tert. butyl styrene, vinyl toluene, vinyl xylene and chlorostyrene as well as copolymers of these and other monomers, particularly the high impact type styrene polymers containing a minor amount, for example about 2 percent to 20 percent by weight, of a rubber-like polymer such as polybutadiene, polyisoprene, or a butadiene-styrene copolymer. A slightly greater concentration of the flameproofing additives may be required for these mixed polymers. In either the regular polymers or the high-impact type, and particularly those where a high degree of transparency is required, the minimum quantity of halogenated compound necessary for satisfactory flameproofing properties should be used to minimize the discoloration associated with the decomposition of the flameproofing agent.

The effectiveness of this unique synergist was evaluated in a series of tests. According to one procedure the polymer and the flameproofing agents were dissolved in methylene chloride then the solvent was permitted to vaporize at an elevated temperature. This produced a plastic foam which was tested for self-extinguishing properties by holding the specimen in a flame until it ignited then removing it from the flame and noting the length of time before it extinguished. The results of tests performed in this manner with various halides in polystyrene are reported in Table I. The synergist used in these tests was $\alpha,\alpha'$-diphenyl-$\alpha$-methoxybibenzyl. The concentration of the synergist and self-extinguishing (S.E.) additive is expressed as weight percent. The reported S.E. times are the averages of several measured times.

TABLE I.—EFFECT OF $\alpha,\alpha'$-DIPHENYL-$\alpha$-METHOXYBIBENZYL ON VARIOUS ADDITIVES IN POLYSTYRENE

| S. E. Additive | Percent | Synergist, Percent | S.E. Time, sec. |
| --- | --- | --- | --- |
| Acetylene tetrabromide | 2.5 | 0 | >25 |
| Do | 1.0 | 0.5 | 2.2 |
| Do | 1.0 | 1.0 | <1 |
| Do | 0.5 | 0.5 | 10.4 |
| Do | 0.5 | 1.0 | 1.8 |
| Pentabromomonochlorocyclohexane | 2.0 | 0 | >25 |
| Do | 1.0 | 1.0 | <1 |
| Tris(2,3-dibromopropyl)phosphate | 2.0 | 0 | >25 |
| Do | 1.0 | 1.0 | 8 |

Other tests were made wherein the flame-proofing agents were present in the emulsion during suspension polymerization of the syrene monomer in laboratory bottle polymerization apparatus. The polymer beads produced in this manner were water-washed then devolatilized in a vacuum oven at 25 mm. and 80° C. for 16 hours. Standard tests bars were prepared by compression molding, then tested for self-extinguishing properties according to the Underwriter's Subject No. 94 Test. The results of these tests are presented in Table II. As in Table I the synergist is $\alpha,\alpha'$-diphenyl-$\alpha$-methoxybibenzyl and the concentrations are in weight percent.

TABLE II.—EFFECT OF $\alpha,\alpha'$-DIPHENYL-$\alpha$-METHOXYBIBENZYL ON VARIOUS ADDITIVES IN POLYSTYRENE

| S. E. Additive | Percent | Synergist, percent | S.E. Time, sec. |
| --- | --- | --- | --- |
| Bis(2,3,3-tribromoallyl)maleate | 3.0 | 0 | 23, >25 |
| Do | 3.0 | 1.0 | 0, 0 |
| Do | 1.5 | 1.0 | 0, 0 |
| Do | 0.75 | 1.0 | 2, 0 |
| Do | 0.38 | 0.5 | 2, 10 |
| 2,4,6-tribromophenylacrylate | 8.0 | 0 | >25 |
| Do | 8.0 | 1.0 | 4, 4 |
| Tetrachlorodibromoethane | 1.0 | 0 | >25 |
| Do | 1.0 | 0.5 | 2 |
| Do | 0.5 | 1.0 | 3 |

The effect of $\alpha,\alpha'$-diphenyl-$\alpha$-methoxybibenzyl on the flameproofing properties of other vinyl aromatic polymers containing halides were determined. The results of these tests are presented in Table III.

TABLE III.—ALKENYL AROMATIC POLYMERS CONTAINING FLAMEPROOFING AGENTS

| Polymer | Acetylene Tetrabromide, Percent | Synergist, Percent | S.E. Time, Sec. |
|---|---|---|---|
| Polystyrene, High Impact | 3 | 0 | >25 |
| Do | 2 | 1 | 15 |
| Do | 2 | 2 | 10 |
| Styrene—79%, α-methyl styrene—21% | 6 | 0 | >25 |
| Do | 6 | 2 | 1 |
| Polyvinyltoluene | 6 | 0 | >25 |
| Do | 4 | 2 | 18 |

The synergism of the halide and the α-α'-diphenyl-α-methoxybibenzyl is clearly shown in these three tables. It will be noted that a polymer composition containing a particular concentration of halide which does not have a class II S.E. time can be upgraded to a class II resin by the addition of a small concentration of the synergist without increasing the concentration of the halide. The data further show that the concentration of the halide usually can be decreased and the class II properties maintained by the addition of a small concentration of the synergist.

The addition of α,α'-diphenyl-α-methoxybibenzyl to polymers to enhance their flameproofing properties does not decrease the thermal decomposition temperature of the polymer whereas the use of a higher concentration of the halide to improve flameproofing properties frequently is accompanied by a drop in the thermal decomposition temperature.

I claim:

1. A self-extinguishing alkenyl aromatic polymer composition containing a halogenated organic compound as a self-extinguishing agent wherein said composition contains from about 0.1 percent to about 2.0 percent by weight of α,α'-diphenyl-α-methoxybibenzyl as a synergist for said self-extinguishing agent.

2. A self-extinguishing foamed styrene polymer containing a halogenated organic compound as a flameproofing agent wherein said polymer contains from about 0.1 to about 2.0 percent by weight of α,α'-diphenyl-α-methoxybibenzyl as a synergist for said flameproofing agent.

3. A self-extinguishing styrene polymer comprising from about 0.1 percent to about 8 percent by weight of a halogenated organic compound and from about 0.1 percent to about 2.0 percent by weight of α,α'-diphenyl-α-methoxybibenzyl as a synergist for said halogenated compound.

4. A method of enhancing the flameproofing characteristics of alkenyl aromatic polymer containing a halogenated organic compound comprising mixing therewith from about 0.1 percent to about 2.0 percent by weight of α,α'-diphenyl-α-methoxybibenzyl.

5. A method of enhancing the flameproofing characteristics of an alkenyl aromatic polymer containing a halogenated compound wherein said polymer is produced by the suspension polymerization of an alkenyl aromatic monomer in the presence of said halogenated compound, the improvement comprising the addition of a synergistic quantity of α,α'-diphenyl-α-methoxybibenzyl to said suspension during said polymerization, the quantity of said α,α'-diphenyl-α-methoxybibenzyl being equal to from about 0.1 to about 2.0 weight percent of said polymer.

References Cited by the Examiner

UNITED STATES PATENTS 3,093,599   6/1963   Mueller-Tamm et al. __ 260—2.5

FOREIGN PATENTS 605,961   9/1960   Canada.

OTHER REFERENCES

Eichhorn: "Synergism of Free Radical Initiators with Self Extinguishing Additives in Vinyl Aromatic Polymers," Journal of Applied Polymer Science, vol. 8, pp. 2497–2524 (1964).

MURRAY TILLMAN, *Primary Examiner.*

N. F. OBLON, *Assistant Examiner.*